US012625236B2

(12) United States Patent
Mori et al.

(10) Patent No.: US 12,625,236 B2
(45) Date of Patent: May 12, 2026

(54) IMAGING APPARATUS AND VARIATION INFORMATION CALCULATION METHOD

(71) Applicant: Nuvoton Technology Corporation Japan, Kyoto (JP)

(72) Inventors: Keiichi Mori, Osaka (JP); Mayu Ogawa, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 1172 days.

(21) Appl. No.: 17/459,362

(22) Filed: Aug. 27, 2021

(65) Prior Publication Data

US 2021/0389433 A1 Dec. 16, 2021

Related U.S. Application Data

(63) Continuation of application No. PCT/JP2020/010163, filed on Mar. 10, 2020.
(Continued)

(51) Int. Cl.
*G01S 7/486* (2020.01)
*G01S 7/4865* (2020.01)
(Continued)

(52) U.S. Cl.
CPC .......... *G01S 7/4868* (2013.01); *G01S 7/4865* (2013.01); *G01S 17/10* (2013.01); *G01S 17/89* (2013.01)

(58) Field of Classification Search
CPC ...... G01S 7/4868; G01S 7/4865; G01S 17/10; G01S 17/89; G01S 7/4863; G01S 17/894; G01S 17/46; G01S 17/32; G01S 17/36
See application file for complete search history.

(56) References Cited

U.S. PATENT DOCUMENTS

| 2016/0222714 A1 | 8/2016 | Rai et al. |
| 2019/0041517 A1 | 2/2019 | Ichiyanagi |
| (Continued) | | |

FOREIGN PATENT DOCUMENTS

| CN | 109313264 A | 2/2019 | |
| EP | 3334151 A1 * | 6/2018 | ............. G01S 17/10 |
| (Continued) | | | |

OTHER PUBLICATIONS

International Search Report and Written Opinion issued on Jun. 16, 2020 in International Patent Application No. PCT/JP2020/010163; with partial English translation.

*Primary Examiner* — Yuqing Xiao
(74) *Attorney, Agent, or Firm* — Rimon P.C.

(57) ABSTRACT

An imaging apparatus includes: a light emitter that irradiates a subject with light; and a solid-state imaging device that includes pixel units each of which converts received light into a signal charge, and a signal processor that calculates distance information indicating a distance to the subject. When one or more of the pixel units receive reflected light which is the light irradiated by the light emitter and reflected by the subject, the signal processor (i) calculates the distance information for each of the pixel units by a time-of-flight (TOF) method that uses signal charges, each of the signal charges being the signal charge into which the received light is converted by each of the pixel units, and (ii) calculates, for each of one or more of the pixel units, variation information indicating an amount of variation regarding the distance indicated by the distance information.

7 Claims, 9 Drawing Sheets

Related U.S. Application Data

(60) Provisional application No. 62/826,715, filed on Mar. 29, 2019.

(51) Int. Cl.
  *G01S 17/10*          (2020.01)
  *G01S 17/89*          (2020.01)

(56) References Cited

U.S. PATENT DOCUMENTS

| | | | |
|---|---|---|---|
| 2019/0113606 A1* | 4/2019 | Mathy | ................... G01S 17/894 |
| 2021/0018623 A1 | 1/2021 | Yang | |

FOREIGN PATENT DOCUMENTS

| | | |
|---|---|---|
| JP | 2008-268023 A | 11/2008 |
| JP | 2018-136123 A | 8/2018 |
| JP | 2019-028013 A | 2/2019 |
| WO | 2015/045588 A1 | 4/2015 |

* cited by examiner

FIG. 7

Second exposure sequence

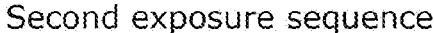

Irradiation light

Reflected light

First read gate 106a:TG1

Second read gate 106b:TG2

Third read gate 106c:TG3

Exposure control gate
108a,108b:ODG

Signal charge B0 read out
by first read gate 106a ——————— S2Xb

Signal charge B1 read out
by second read gate 106b ——————— S2Yb

Signal charge B2 read out
by third read gate 106c ——————— S2Zb

Second
exposure
period

First
exposure
period   t21  t22  t23  t24   Third
exposure
period

Tp   Tp   Tp

IMAGING APPARATUS AND VARIATION INFORMATION CALCULATION METHOD

CROSS REFERENCE TO RELATED APPLICATIONS

This is a continuation application of PCT International Application No. PCT/JP2020/010163 filed on Mar. 10, 2020, designating the United States of America, which is based on and claims priority of U.S. Provisional Patent Application No. 62/826,715 filed on Mar. 29, 2019. The entire disclosures of the above-identified applications, including this specifications, drawings and claims are incorporated herein by reference in their entirety.

FIELD

The present disclosure relates to imaging apparatuses that obtain distance information of a subject.

BACKGROUND

Imaging apparatuses that perform distance measurement using a time-of-flight (TOF) method and calculate distance information indicating the distance to a subject are conventionally known (for example, see PTL 1).

CITATION LIST

Patent Literature

PTL 1: Japanese Unexamined Patent Application Publication No. 2018-136123

SUMMARY

Technical Problem

Processes performed using a distance indicated by distance information to be calculated include a process that enables obtaining more appropriate results if the reliability of the distance can be determined (e.g., a filtering process performed on a distance map).

In view of this, the present disclosure provides an imaging apparatus, etc. capable of determining the reliability of the distance indicated by distance information to be calculated.

Solution to Problem

An imaging apparatus according to an aspect of the present disclosure includes: a light emitter that irradiates a subject with light; and a solid-state imaging device that includes pixel units each of which converts received light into a signal charge, and a signal processor that calculates distance information indicating a distance to the subject. When one or more of the pixel units receive reflected light which is the light irradiated by the light emitter and reflected by the subject, the signal processor (i) calculates the distance information for each of the pixel units by a time-of-flight (TOF) method that uses signal charges, each of the signal charges being the signal charge into which the received light is converted by each of the pixel units, and (ii) calculates variation information for each of one or more of the pixel units, the variation information indicating an amount of variation regarding the distance indicated by the distance information.

A variation information calculation method according to an aspect of the present disclosure is used by an imaging apparatus that includes: a light emitter that irradiates a subject with light; and a solid-state imaging device that includes pixel units each of which converts received light into a signal charge, and a signal processor that calculates distance information indicating a distance to the subject. The variation information calculation method includes: when one or more of the pixel units receive reflected light which is the light irradiated by the light emitter and reflected by the subject, (i) calculating, by the signal processor, the distance information for each of the pixel units by a TOF method that uses signal charges, each of the signal charges being the signal charge into which the received light is converted by each of the pixel units, and (ii) calculating, by the signal processor, variation information for each of one or more of the pixel units, the variation information indicating an amount of variation regarding the distance information.

Advantageous Effects

Provided is an imaging apparatus, etc. capable of determining the reliability of the distance indicated by distance information to be calculated.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 7 is a timing chart regarding a second exposure sequence according to Embodiment 1.

DESCRIPTION OF EMBODIMENTS

Figure 1:
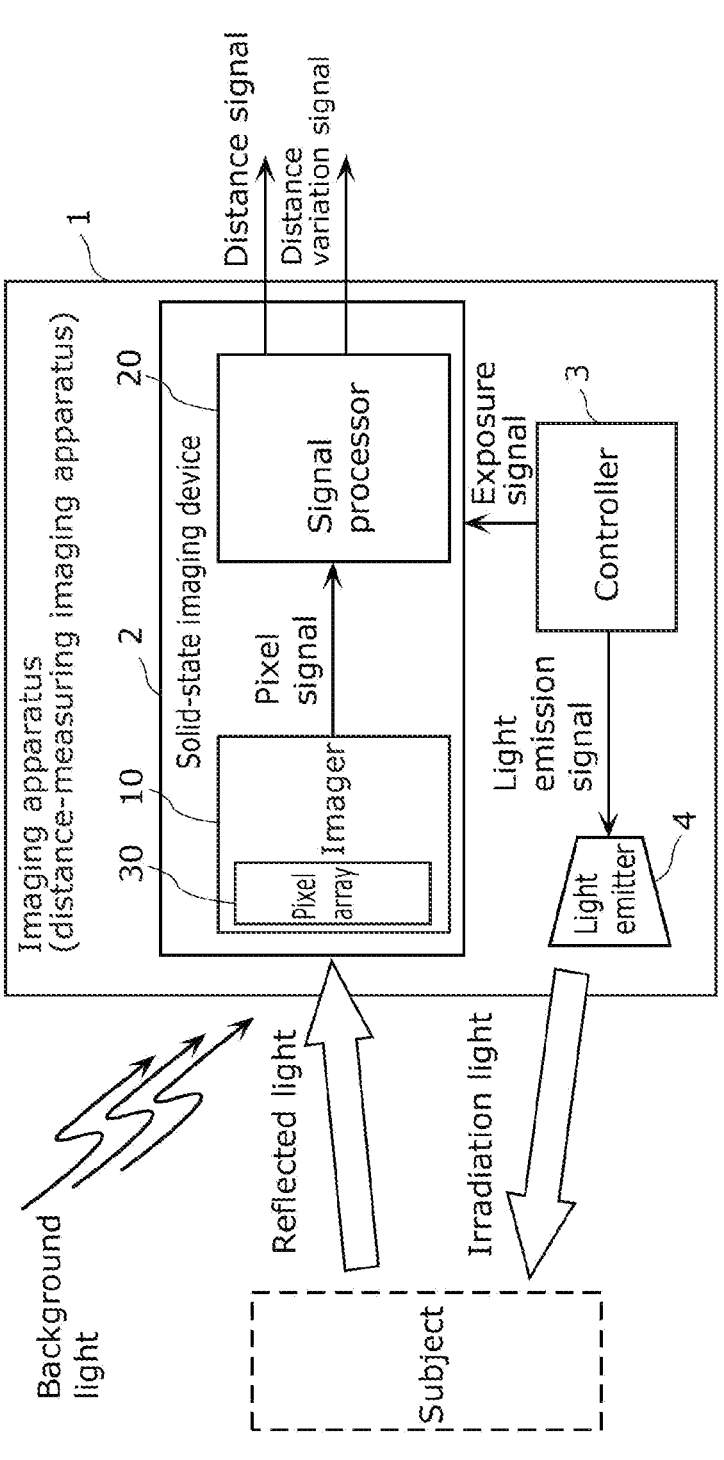
FIG. 1 is a block diagram illustrating an example of a configuration of an imaging apparatus according to Embodiment 1.

An imaging apparatus according to an aspect of the present disclosure includes: a light emitter that irradiates a subject with light; and a solid-state imaging device that includes pixel units each of which converts received light into a signal charge, and a signal processor that calculates distance information indicating a distance to the subject. When one or more of the pixel units receive reflected light which is the light irradiated by the light emitter and reflected by the subject, the signal processor (i) calculates the distance information for each of the pixel units by a time-of-flight (TOF) method that uses signal charges, each of the signal charges being the signal charge into which the received light is converted by each of the pixel units, and (ii) calculates variation information for each of one or more of the pixel units, the variation information indicating an amount of variation regarding the distance indicated by the distance information.

According to the imaging apparatus having the above configuration, variation information indicating an amount of variation regarding a distance indicated by distance information to be calculated is calculated. By using the variation information, it is possible to determine the reliability of the distance indicated by the distance information. Accordingly, with the imaging apparatus having the above configuration, it is possible to determine the reliability of the distance indicated by distance information to be calculated.

The pixel units may constitute a pixel array in which the pixel units are arranged in rows and columns, and the signal processor may calculate the variation information for each of the pixel units.

The variation information may indicate a standard deviation of the distance to the subject, the distance being indicated by the distance information.

For each of the pixel units, the signal processor may (i) calculate a light emission component received-light amount indicating a light reception component of the reflected light out of the signal charge of the pixel unit, and (ii) calculate the distance information of the pixel unit based on the light emission component received-light amount. The variation information may indicate a standard deviation of the light emission component received-light amount.

The light emitter may irradiate pulsed light as the light, and the signal processor may calculate, for each of the pixel units, the distance information of the pixel unit based on a first signal charge and a second signal charge. The first signal charge is a signal charge into which light received during a first period and light received during a second period are converted by the pixel unit.

The second signal charge is a signal charge into which light received during the second period is converted by the pixel unit. The second period follows the first period, and a period between a start of the first period and an end of the second period is longer than an irradiation time of the pulsed light.

A variation information calculation method according to an aspect of the present disclosure is used by an imaging apparatus that includes: a light emitter that irradiates a subject with light; and a solid-state imaging device that includes pixel units each of which converts received light into a signal charge, and a signal processor that calculates distance information indicating a distance to the subject. The variation information calculation method includes: when one or more of the pixel units receive reflected light which is the light irradiated by the light emitter and reflected by the subject, (i) calculating, by the signal processor, the distance information for each of the pixel units by a TOF method that uses signal charges, each of the signal charges being the signal charge into which the received light is converted by each of the pixel units, and (ii) calculating, by the signal processor, variation information for each of one or more of the pixel units, the variation information indicating an amount of variation regarding the distance information.

According to the variation information calculation method including the above processes, variation information indicating an amount of variation regarding a distance indicated by distance information to be calculated is calculated. By using the variation information, it is possible to determine the reliability of the distance indicated by the distance information. Accordingly, with the variation information calculation method including the above processes, it is possible to determine the reliability of the distance indicated by distance information to be calculated.

Hereinafter, specific examples of the imaging apparatus according to an aspect of the present disclosure will be described in detail with reference to the drawings. Note that each of the embodiments described below shows a specific example of the present disclosure. Accordingly, numerical values, shapes, elements, the placement and connection of the elements, etc. in the following embodiments are mere examples, and are not intended to limit the present disclosure. Moreover, the drawings are schematic diagrams and do not necessarily provide strictly accurate illustrations.

Embodiment 1

Hereinafter, an imaging apparatus according to Embodiment 1 will be described. The imaging apparatus measures a distance using a TOF method for measuring a distance using a time of flight during which light travels to and from a subject. Since the imaging apparatus measures the distance to a subject, the imaging apparatus is also referred to as a distance-measuring imaging apparatus.

FIG. 1 is a block diagram illustrating an example of a configuration of imaging apparatus 1 according to Embodiment 1.

As illustrated in FIG. 1, imaging apparatus 1 includes solid-state imaging device 2, controller 3, and light emitter 4.

Controller 3 outputs a light emission signal for instructing the irradiation of a subject with light, and an exposure signal for instructing the exposure of reflected light from the subject and background light attributed to, for instance, sun light. Controller 3 is implemented by using, for example, a memory and a processor that executes a program stored in the memory.

Light emitter 4 has a light-emitting element and irradiates the subject with light according to the light emission signal that is output from controller 3. The light-emitting element is implemented by, for example, a laser diode, a vertical cavity surface emitting laser (VCSEL), or a light-emitting diode (LED). The irradiation light is, for example, infrared light.

Solid-state imaging device 2 includes imager 10 and signal processor 20. Solid-state imaging device 2 is implemented by, for example, a CMOS image sensor.

Imager 10 includes pixel array 30 in which pixel units 100 (not shown in FIG. 1 but shown in FIG. 3 and FIG. 4 that are to be described later) each of which converts received light into a signal charge are arranged in an array.

Pixel array 30 receives reflected light that is light irradiated by light emitter 4 and reflected by the subject. Pixel array 30 also receives background light attributed to, for instance, sun light. Pixel array 30 is exposed according to the exposure signal that is output from controller 3.

When pixel array 30 is exposed, imager 10 outputs pixel signals corresponding to pixel units 100 constituting pixel array 30.

Figure 2:
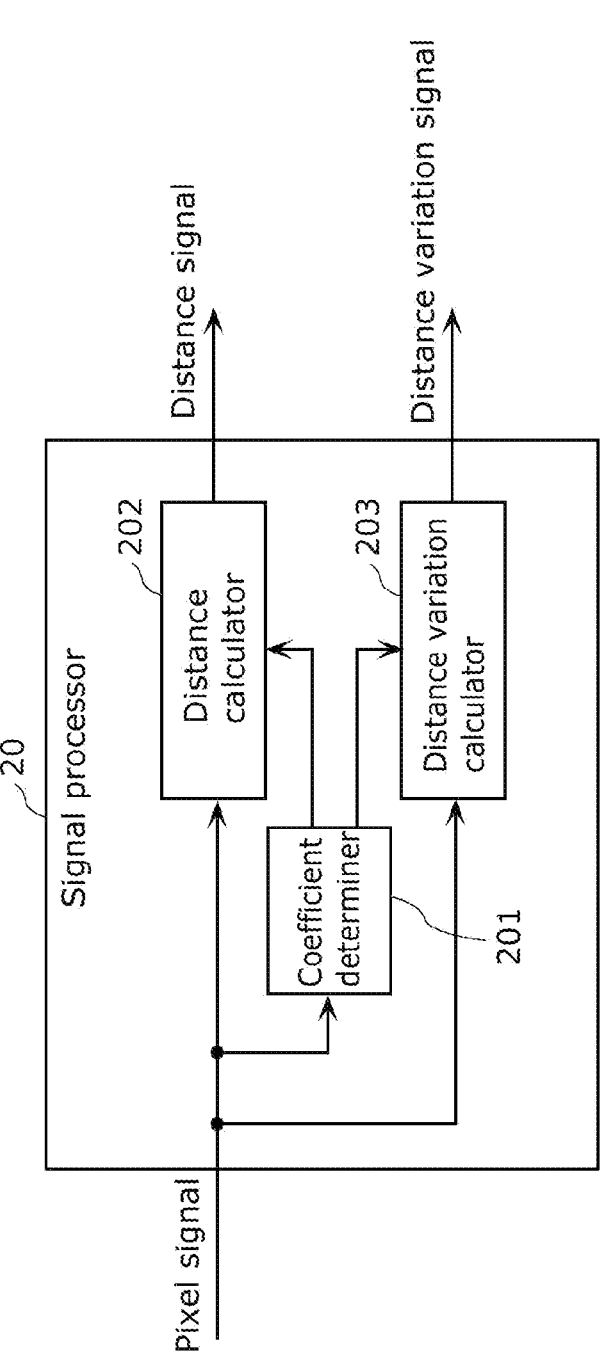
FIG. 2 is a block diagram illustrating an example of a configuration of a signal processor according to Embodiment 1.

FIG. 2 is a block diagram illustrating an example of a configuration of signal processor 20.

As illustrated in FIG. 2, signal processor 20 includes coefficient determiner 201, distance calculator 202, and distance variation calculator 203. Signal processor 20 is implemented by, for example, a logic circuit. Alternatively, signal processor 20 is implemented by using, for example, a memory and a processor that executes a program stored in the memory.

Coefficient determiner 201 determines coefficients with which the pixel signals that are output from imager 10 are to be multiplied. The determination of the coefficients performed by coefficient determiner 201 will be described later.

Distance calculator 202 calculates, for each of the pixel units, a distance signal indicating the distance to a subject, based on the pixel signals that are output from imager 10 and the coefficients determined by coefficient determiner 201. The calculation of the distance signal performed by distance calculator 202 will be described later.

Distance variation calculator 203 calculates a distance variation signal indicating an amount of variation regarding the distance indicated by the distance signal, based on the pixel signals that are output from imager 10 and the coefficients determined by coefficient determiner 201. The calculation of the distance variation signal performed by distance variation calculator 203 will be described later.

Figure 3:
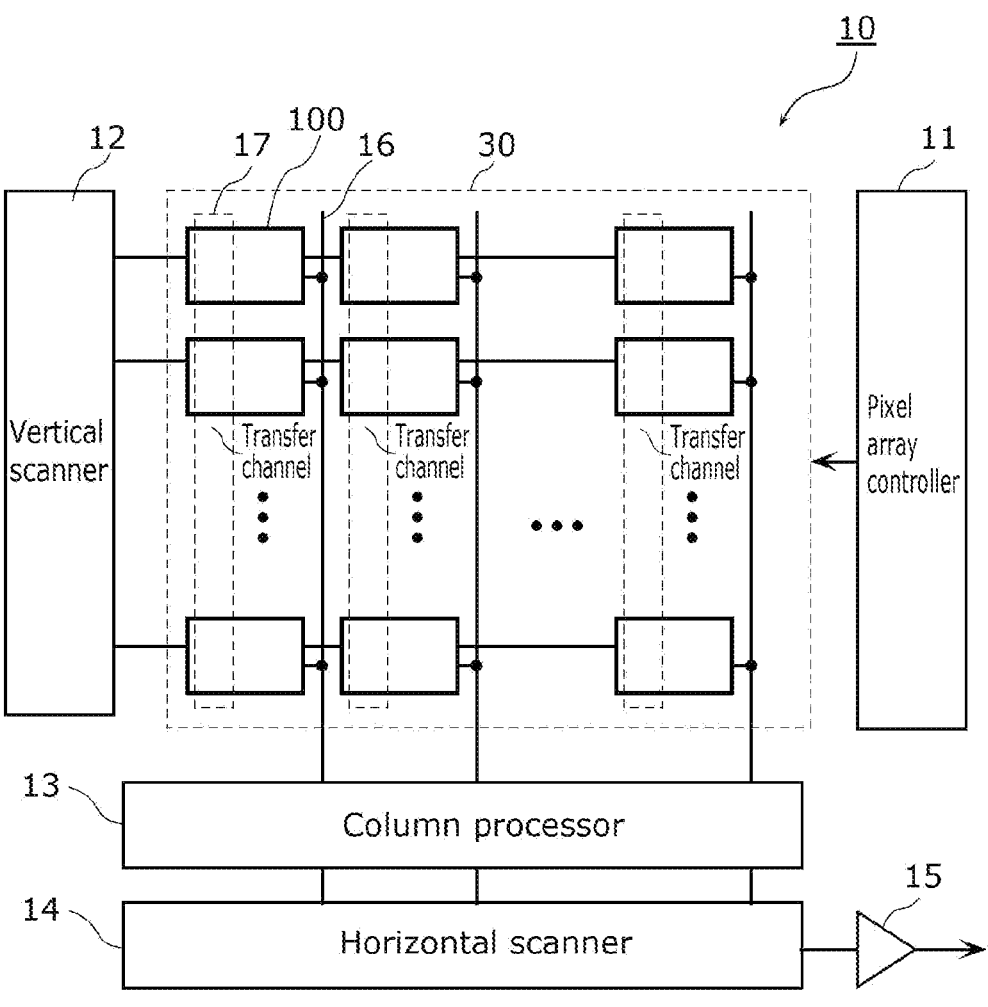
FIG. 3 is a block diagram illustrating an example of a configuration of an imager according to Embodiment 1.

FIG. 3 is a block diagram illustrating an example of a configuration of imager 10.

As illustrated in FIG. 3, imager 10 includes pixel array 30, pixel array controller 11, vertical scanner 12, column processor 13, horizontal scanner 14, and output buffer 15.

Pixel array 30 includes pixel units 100 arranged in rows and columns, and vertical signal lines 16 each of which is provided for a different one of the columns.

In pixel array 30, transfer channels 104 (to be described later) included in pixel units 100 aligned in a column direction are linearly coupled to form transfer channel 17 for each of the columns.

Figure 4:
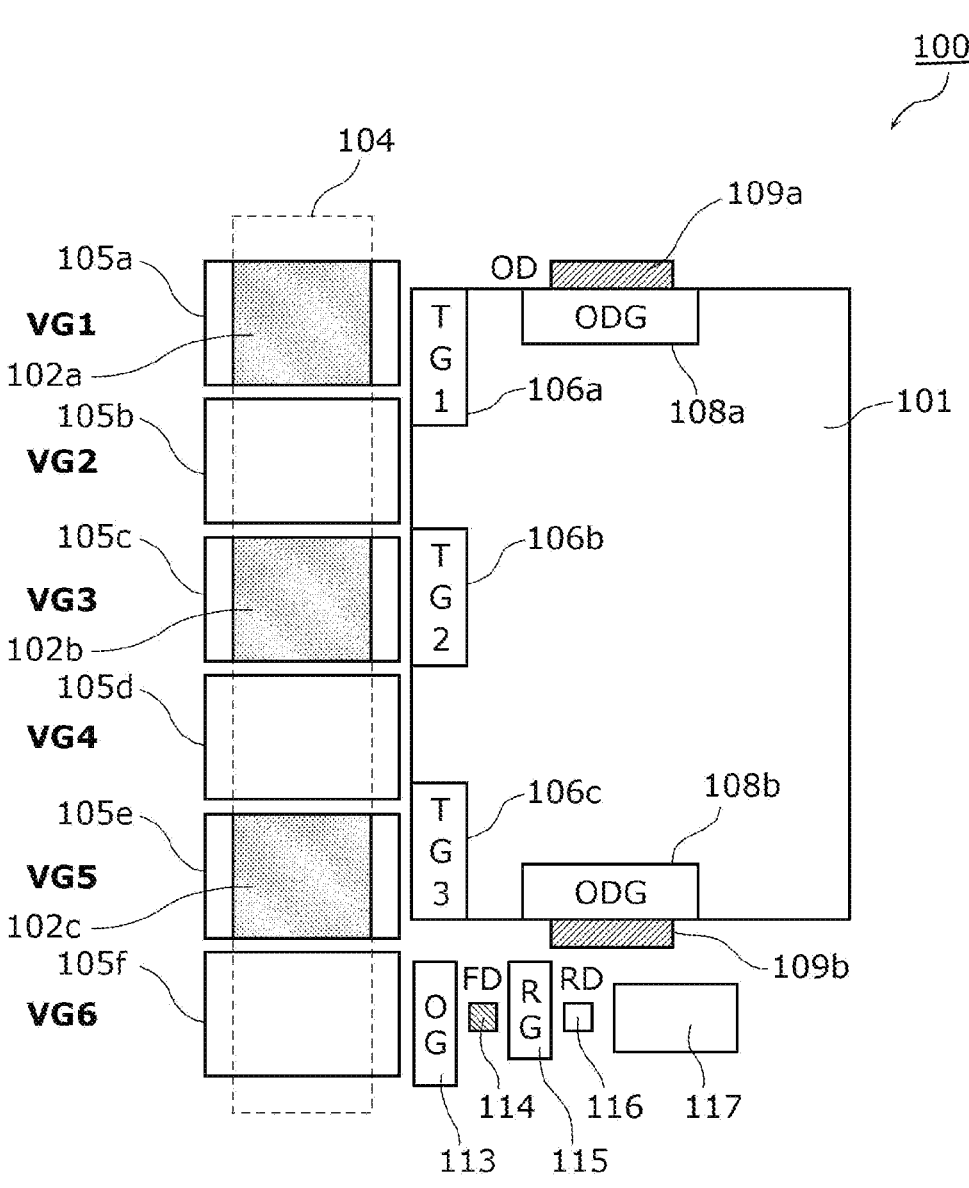
FIG. 4 is a block diagram illustrating an example of a configuration of a pixel unit according to Embodiment 1.

FIG. 4 is a schematic diagram illustrating an example of a configuration of pixel unit 100.

As illustrated in FIG. 4, pixel unit 100 includes photoelectric converter 101, charge accumulators 102 (for example, first charge accumulator 102a, second charge accumulator 102b, and third charge accumulator 102c), read gates 106 (for example, first read gate 106a, second read gate 106b, and third read gate 106c), output control gate 113, floating diffusion layer 114, reset gate 115, reset drain 116, read circuit 117, exposure control gates 108 (for example, exposure control gates 108a and 108b), and overflow drains 109 (for example, overflow drains 109a and 109b).

Photoelectric converter 101 converts received light into a signal charge.

Read gates 106 read the signal charge from photoelectric converter 101.

Charge accumulators 102 accumulate the signal charge read out by read gates 106. Charge accumulators 102 are each composed of transfer channel (CCD channel) 104 which is for transferring a signal charge and is located under a gate insulator, and transfer electrode 105 (e.g., any of transfer electrodes 105a, 105b, 105c, 105d, 105e, and 105f) located above the gate insulator. In other words, charge accumulators 102 each include a part of transfer channel 104 and a part of transfer electrode 105 that overlaps the part of transfer channel 104 in a plan view of the semiconductor substrate, as illustrated in FIG. 4. The number of transfer channels 104 per one pixel unit 100 is one, as illustrated in FIG. 4. As described above, in pixel array 30, transfer channels 104 of pixel units 100 aligned in a column direction are linearly coupled in the column direction, as illustrated in FIG. 4. Accordingly, transfer channel 17 is formed for each of the columns in pixel array 30.

In the present embodiment, voltages applied to transfer electrodes 105a, 105b, 105c, 105d, 105e, and 105f are denoted by VG1, VG2, VG3, VG4, VG5, and VG6, respectively.

First charge accumulator 102a, second charge accumulator 102b, and third charge accumulator 102c perform 6-phase drive.

When VG1, VG3, and VG5 which become high voltages are applied from pixel array controller 11, first charge accumulator 102a, second charge accumulator 102b, and third charge accumulator 102c are formed adjacent to first read gate 106a, second read gate 106b, and third read gate 106c, respectively, under transfer electrodes 105 in the depth directions thereof (in this example, under transfer electrode 105a, transfer electrode 105c, and transfer electrode 105e in the respective depth directions thereof).

Overflow drain 109 discharges a signal charge from photoelectric converter 101.

Exposure control gate 108 controls the discharge to overflow drain 109.

Floating diffusion layer 114 receives, from one of charge accumulators 102 (first charge accumulator 102a, second charge accumulator 102b, and third charge accumulator 102c in this example), the transfer of the signal charge accumulated in that charge accumulator 102, and holds the signal charge.

Output control gate 113 controls the transfer to floating diffusion layer 114.

Read circuit 117 converts the signal charge held in floating diffusion layer 114 into a voltage and reads the voltage from pixel unit 100 to vertical signal line 16. Read circuit 117 includes, for example, a source follower transistor having a gate connected to floating diffusion layer 114, and a selection transistor connected in series to the source follower transistor. For example, with read circuit 117 being selected by the selection transistor, the signal charge held in floating diffusion layer 114 is converted into a voltage signal and read out to vertical signal line 16 by that read circuit 117.

The following pulses are applied from pixel array controller 11: drive pulse ODG is applied to each of exposure control gates 108a and 108b; drive pulses TG1, TG2, and TG3 are applied to first read gate 106a, second read gate 106b, and third read gate 103c, respectively; and drive pulses VG1 through VG6 are respectively applied to transfer electrodes 105a through 105f. During exposure, high voltage is applied to VG1, VG3, and VG5 while low voltage is applied to the other electrodes, and this allows charge accumulation under each of transfer electrodes 105 to which high voltage is applied. In other words, transfer electrodes 105 (transfer electrodes 105a, 105c, and 105e in this example) to which high voltage is applied and transfer channel 104 overlapping transfer electrodes 105 from below form charge accumulators 102 (first charge accumulator 102a, second charge accumulator 102b, and third charge accumulator 102c in this example).

In an initial state, ODG is in high state and photoelectric converter 101 is in reset state. First read gate 106a, second read gate 106b, and third read gate 106c are in low state (inactivated state), and first charge accumulator 102a, second charge accumulator 102b, and third charge accumulator 102c in which transfer electrode 105a, transfer electrode 105c, and transfer electrode 105e are respectively held in high state (activated state) are electrically disconnected from photoelectric converter 101. A signal charge generated by photoelectric converter 101 in this state is discharged to overflow drain 109 via exposure control gate 108.

Returning back to FIG. 3, the description of the configuration of imager 10 will continue.

Pixel array controller 11 controls pixel units 100 constituting pixel array 30, based on an exposure signal that is output from controller 3.

Vertical scanner 12 scans, on a row-by-row basis, signal charges read out from pixel units 100 constituting pixel array 30. In other words, rows are sequentially selected one by one and the signal charges are output to vertical signal lines 16 each of which is provided for a different one of the columns.

Column processor 13 receives the signal charges that have been output to vertical signal lines 16, and performs correlated double sampling (CDS) to output the signal charges as pixel signals.

Horizontal scanner 14 scans the pixel signals that are output from column processor 13, that is, horizontal scanner 14 sequentially selects and outputs the pixel signals one by one. In some cases, column processor 13 has an A/D conversion circuit that converts signal charges into digital signals for each column of vertical signal lines 16.

Output buffer 15 outputs the pixel signals received from horizontal scanner 14.

Pixel unit 100 having the above configuration is a unit that outputs a signal required for calculating a single distance signal.

Hereinafter, an operation performed by imaging apparatus 1 having the above configuration will be described with reference to the figures.

Figure 5:
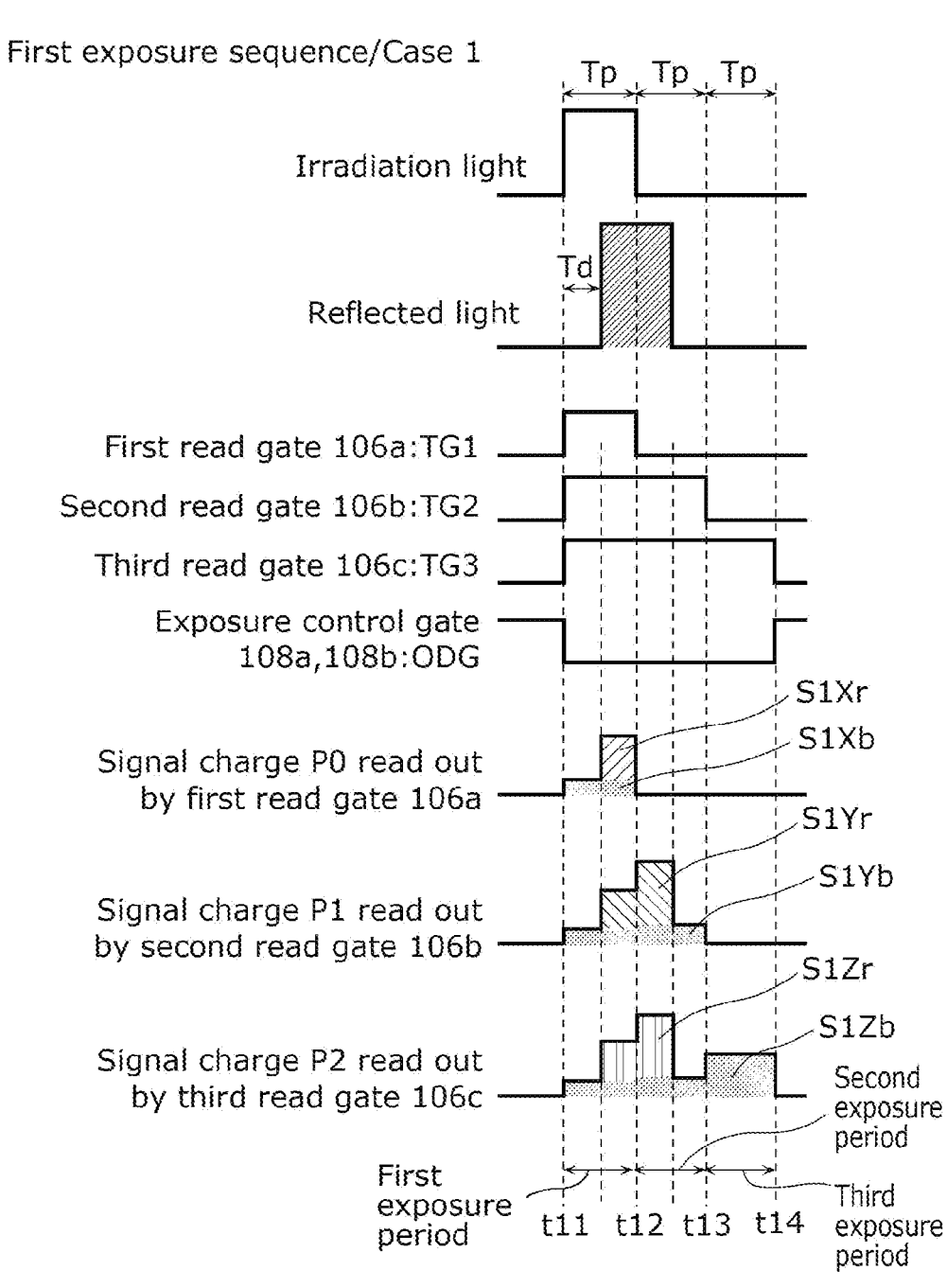
FIG. 5 is a timing chart regarding a first exposure sequence according to Embodiment 1.
Figure 6:
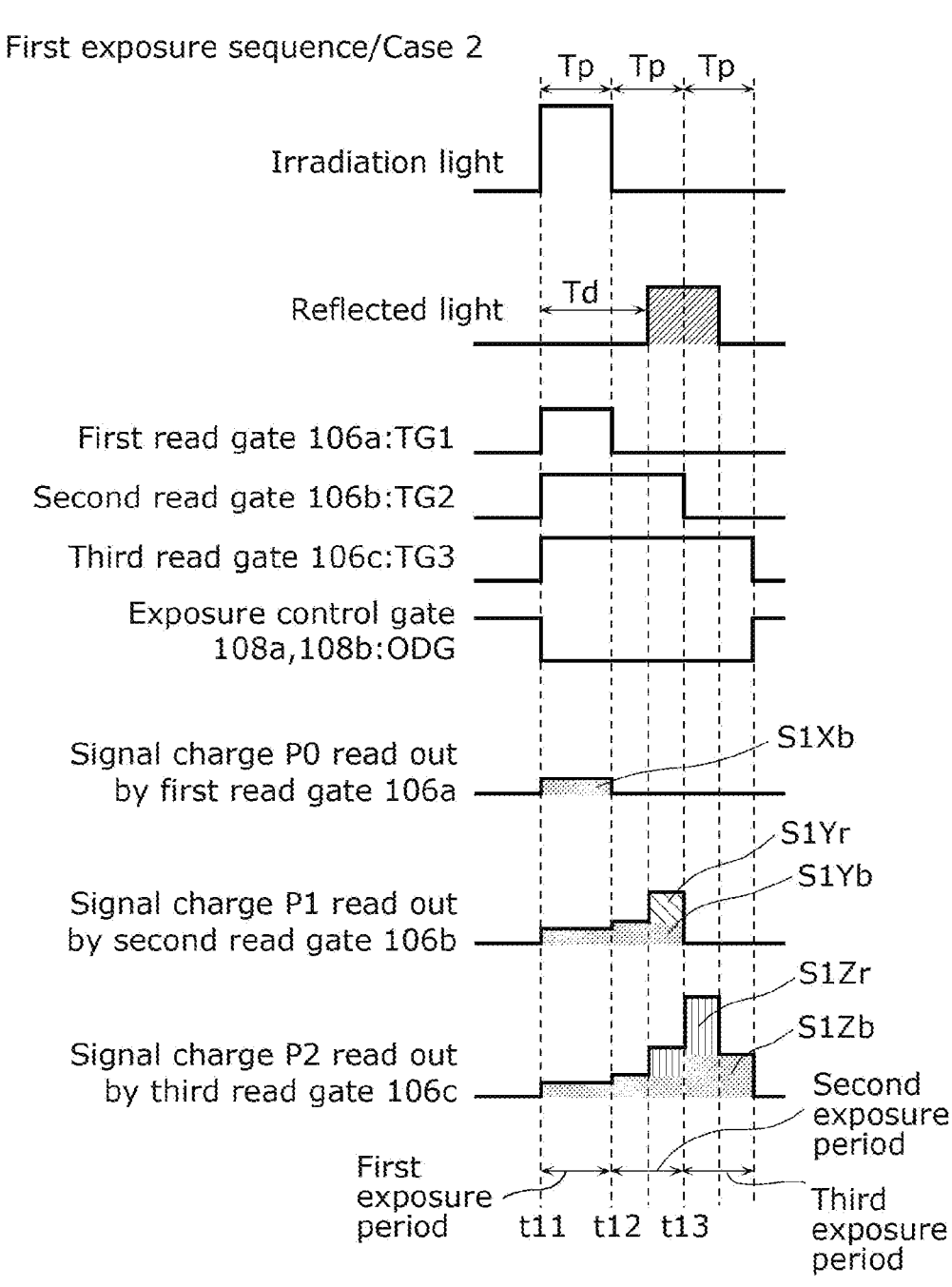
FIG. 6 is another timing chart regarding the first exposure sequence according to Embodiment 1.

FIG. 5 and FIG. 6 are each a timing chart of a first exposure sequence, indicating the light emission timing of light emitter 4, the exposure and signal accumulation timings of pixel unit 100, and the exposure states of signal charges accumulated in charge accumulators 102a, 102b, and 102c respectively via first read gate 106a, second read gate 106b, and third read gate 106c.

The first exposure sequence includes a first exposure period, a second exposure period, and a third exposure period. The first exposure period synchronizes with time Tp which is a period from the start until the end of the irradiation of pulsed light which is emitted from light emitter 4 and whose timing is controlled by controller 3a. The second exposure period is a period from when the irradiation of the pulsed light is ended until when time Tp elapses. The third exposure period is a period from when the second exposure period is ended until when time Tp elapses.

When the first exposure sequence is started, with an instruction from controller 3, pulsed light having duration of time Tp is irradiated from light emitter 4. After the delay of time Td that is in accordance with the distance from imaging apparatus 1, reflected light which is the irradiated pulsed light reflected by a subject reaches pixel unit 100 and is converted into a signal charge by photoelectric converter 101.

FIG. 5 is a timing chart in case 1 where the reflected light of pulsed light is received by photoelectric converter 101 across the first exposure period and the second exposure period, that is, the case where a subject is located relatively close to imaging apparatus 1. FIG. 6 is a timing chart in case 2 where the reflected light of pulsed light is received by photoelectric converter 101 across the second exposure period and the third exposure period, that is, the case where a subject is located relatively away from imaging apparatus 1.

With an instruction from controller 3, pixel array controller 11 causes ODG to transition from high state to low state in synchronization with time t11 at which the first exposure period is started, and in parallel to this, causes all of first read gate 106a, second read gate 106b, and third read gate 106c to transition from low state (inactivated state) to high state (activated state).

With the operation of pixel array controller 11, the discharge of a signal charge from photoelectric converter 101 to overflow drain 109 is stopped, and a signal charge, into which (i) light, of the reflected light of the pulsed light irradiated from light emitter 4, which has reached photoelectric converter 101 during the first exposure period, and (ii) background light other than the reflected light that has reached photoelectric converter 101 during the first exposure period are converted by photoelectric converter 101, is accumulated in first charge accumulator 102a via first read gate 106a, in second charge accumulator 102b via second read gate 106b, and in third charge accumulator 102c via third read gate 106c. Accordingly, approximately a third of the signal charge, into which the light and the background light are converted by photoelectric converter 101, is distributed to and accumulated in each of first charge accumulator 102a, second charge accumulator 102b, and third charge accumulator 102c.

Next, in the second exposure period, with an instruction from controller 3, pixel array controller 11 causes first read gate 106a to transition from high state (activated state) to low state (inactivated state) at time t12 that is timing at which the second exposure period is started. Accordingly, the accumulation of the signal charge into first charge accumulator 102a is stopped.

With the operation of pixel array controller 11, a signal charge, into which reflected light and background light that have reached photoelectric converter 101 during the second exposure period are converted by photoelectric converter 101, is accumulated in second charge accumulator 102b via second read gate 106b and in third charge accumulator 102c via third read gate 106c. Accordingly, approximately a half of the signal charge into which the reflected light and the background light are converted by photoelectric converter 101 is distributed to and accumulated in each of second charge accumulator 102b and third charge accumulator 102c.

Next, in the third exposure period, with an instruction from controller 3, pixel array controller 11 causes second read gate 106b to transition from high state (activated state) to low state (inactivated state) at time t13 that is timing at which the third exposure period is started. Accordingly, the accumulation of the signal charge into second charge accumulator 102b is stopped.

With the operation of pixel array controller 11, all of a signal charge, into which reflected light and background light that have reached photoelectric converter 101 during the third exposure period are converted by photoelectric converter 101, is accumulated in third charge accumulator 102c via third read gate 106c.

By causing, with an instruction from controller 3, third read gate 106c to transition from high state (activated state) to low state (inactivated state) at a point in time t14 when the third exposure period is ended, pixel array controller 11 stops the accumulation of the signal charge into third charge accumulator 102c. Along with this, by causing ODG to transition from low state to high state, pixel array controller 11 places exposure control gates 108 in a conductive state. Accordingly, photoelectric converter 101 returns back to a reset state.

Hereinafter, the signal charge accumulated in first charge accumulator 102a via first read gate 106a, the signal charge accumulated in second charge accumulator 102b via second read gate 106b, and the signal charge accumulated in third charge accumulator 102c via third read gate 106c at a point in time when the first exposure sequence is ended are respectively denoted by P0, P1, and P2.

With the operation of reading the signal charges, signal charge P0, signal charge P1, and signal charge P2 are output as pixel signal P0, pixel signal P1, and pixel signal P2, respectively, in a raster scanning order from each pixel unit 100 to signal processor 20, and are held by signal processor 20.

Hereinafter, the operation of reading a signal charge will be described. The following describes an example of reading signal charge P0, but the same operation is performed for reading any of the other signal charges.

With an instruction from controller 3, pixel array controller 11 moves, for all of pixel units 100, signal charge P0 held by first charge accumulator 102a to under transfer electrode 105f to which VG6 is applied through a charge transfer caused by the application of the 6-phase drive pulses of VG1 through VG6 to transfer electrodes 105a through 105f.

With an instruction from pixel array controller 11, vertical scanner 12 performs the following for pixel units 100 in a predetermined row to output a non-signal voltage to vertical signal lines 16: activating reset gate 115 in a state in which output control gate 113 is inactivated, to discharge an unnecessary charge that remains in floating diffusion layer 114 to reset drain 116; and subsequently activating read circuit 117.

With an instruction from vertical scanner 12, column processor 13 holds the non-signal voltage that is output to vertical signal line 16 of each column.

Subsequently, vertical scanner 12 performs the following for pixel units 100 in the same row to output the signal voltage of signal charge P0 to vertical signal lines 16: activating reset gate 115 in a state in which output control gate 113 is inactivated, to discharge an unnecessary charge that remains in floating diffusion layer 114 to reset drain 116; subsequently activating output control gate 113 to transfer signal charge P0 held under transfer electrode 105f to floating diffusion layer 114; and subsequently activating read circuit 117.

With an instruction from vertical scanner 12, column processor 13 performs correlated double sampling using the non-signal voltage held at the head of each column and the signal voltage of signal charge P0, and outputs, to horizontal scanner 14, and holds pixel signal P0 of each column.

With an instruction from vertical scanner 12, horizontal scanner 14 sequentially scans a group of pixel signals P0 of one row which are output and held by column processor 13. By thus sequentially scanning pixel signals P0, horizontal scanner 14 sequentially selects, in a horizontal direction, pixel signals P0 corresponding to pixel units 100 in a predetermined row, to output pixel signals P0 to signal processor 20 via output buffer 15.

Vertical scanner 12 sequentially performs, on a row-by-row basis, a sequence of operations from the output control of the non-signal voltage to the output control of pixel signals P0 of one row performed by horizontal scanner 14, and output, by means of raster scanning, all of pixel signals P0 corresponding to pixel units 100 from imager 10 via output buffer 15.

FIG. 7 is a timing chart of a second exposure sequence, indicating the exposure and signal accumulation timings of pixel unit 100 and the exposure states of the signal charges accumulated in charge accumulators 102a, 102b, and 102c respectively via first read gate 106a, second read gate 106b, and third read gate 106c.

The second exposure sequence includes a first exposure period, a second exposure period, and a third exposure period. The first exposure period has the same length as that of time Tp, in the first exposure sequence, which is a period from the start until the end of the irradiation of pulsed light from light emitter 4. The second exposure period is a period from when the first exposure period is ended until when time Tp elapses. The third exposure period is a period from when the second exposure period is ended until when time Tp elapses.

In the second exposure sequence, pulsed light is not irradiated from light emitter 4.

With an instruction from controller 3, pixel array controller 11 causes ODG to transition from high state to low state in synchronization with time t21 at which the first exposure period is started, and in parallel to this, causes all of first read gate 106a, second read gate 106b, and third read gate 106c to transition from low state (inactivated state) to high state (activated state).

With the operation of pixel array controller 11, the discharge of a signal charge from photoelectric converter 101 to overflow drain 109 is stopped, and a signal charge, into which background light that has reached photoelectric converter 101 during the first exposure period is converted by photoelectric converter 101, is accumulated in first charge accumulator 102a via first read gate 106a, in second charge accumulator 102b via second read gate 106b, and in third charge accumulator 102c via third read gate 106c. Accordingly, approximately a third of the signal charge into which the background light is converted by photoelectric converter 101 is distributed to and accumulated in each of first charge accumulator 102a, second charge accumulator 102b, and third charge accumulator 102c.

Next, in the second exposure period, with an instruction from controller 3, pixel array controller 11 causes first read gate 106a to transition from high state (activated state) to low state (inactivated state) at time t22 that is timing at which the second exposure period is started. Accordingly, the accumulation of the signal charge into first charge accumulator 102a is stopped.

With the operation of pixel array controller 11, a signal charge, into which background light that has reached photoelectric converter 101 during the second exposure period is converted by photoelectric converter 101, is accumulated in second charge accumulator 102b via second read gate 106b and in third charge accumulator 102c via third read gate 106c. Accordingly, approximately a half of the signal charge into which the background light is converted by photoelectric converter 101 is distributed to and accumulated in each of second charge accumulator 102b and third charge accumulator 102c.

Next, in the third exposure period, with an instruction from controller 3, pixel array controller 11 causes second read gate 106b to transition from high state (activated state) to low state (inactivated state) at time t23 that is timing at which the third exposure period is started. Accordingly, the accumulation of the signal charge into second charge accumulator 102b is stopped.

With the operation of pixel array controller 11, all of a signal charge, into which background light that has reached photoelectric converter 101 during the third exposure period is converted by photoelectric converter 101, is accumulated in third charge accumulator 102c via third read gate 106c.

By causing, with an instruction from controller 3, third read gate 106c to transition from high state (activated state) to low state (inactivated state) at time t24 when the third exposure period is ended, pixel array controller 11 stops the accumulation of the signal charge into third charge accumulator 102c. Along with this, by causing ODG to transition from low state to high state, pixel array controller 11 places exposure control gates 108 in a conductive state. Accordingly, photoelectric converter 101 returns back to a reset state.

Hereinafter, the signal charge accumulated in first charge accumulator 102a via first read gate 106a, the signal charge accumulated in second charge accumulator 102b via second read gate 106b, and the signal charge accumulated in third charge accumulator 102c via third read gate 106c at a point in time when the second exposure sequence is ended are respectively denoted by B0, B1, and B2.

With the operation of reading the signal charges, signal charge B0, signal charge B1, and signal charge B2 are output as pixel signal B0, pixel signal B1, and pixel signal B2, respectively, in a raster scanning order from each pixel unit 100 to signal processor 20, and are held by signal processor 20.

Pixel signal B0 becomes equal to a background light component (signal charge S1Xb in FIG. 5 or FIG. 6) included in pixel signal P0. Pixel signal B1 becomes equal to a background light component (signal charge S1Yb in FIG. 5 or FIG. 6) included in pixel signal P1. Pixel signal B2 becomes equal to a background light component (signal charge S1Zb in FIG. 5 or FIG. 6) included in pixel signal P2.

When pixel signals P0, P1, P2, B0, B1, and B2 are held by signal processor 20 for all of pixel units 100, coefficient determiner 201 determines, for each pixel unit 100, a set of coefficients to be used by distance calculator 202 and distance variation calculator 203, based on pixel signals P0, P1, P2, B0, B1, and B2. More specifically, coefficient determiner 201 determines, for each pixel unit 100, pixel signal coefficient values k01, k02, k03, k04, k05, k06, k11, k12, k13, k14, k15, and k16 defined in Equation 1 under Condition 1 or Equation 2 under Condition 2, as indicated below.

When $P0-B0 \geq P2-B2-P1+B1$,      Condition 1

$k01=-2$ $k02=+1$ $k03=+1$ $K04=+2$ $k05=-1$ $k06=-1$ $k11=+1$ $k12=+1$ $k13=+1$ $k14=-1$ $k15=-1$ $k16=-1$      Equation 1

When $P0-B0<P2-B2-P1+B1$,      Condition 2

$k01=0$ $k02=0$ $k03=+2$ $k04=0$ $k05=0$ $k06=-2$ $k11=0$ $k12=+1$ $k13=+1$ $k14=0$ $k15=-1$ $k16=-1$      Equation 2

The case where Condition 1 holds true corresponds to case 1 in which a subject is located relatively close to imaging apparatus 1, and the case where Condition 2 holds true corresponds to case 2 in which a subject is located relatively away from imaging apparatus 1.

When pixel signal coefficient values are determined by coefficient determiner 201, distance calculator 202 calculates distance signal Dout for each pixel unit 100, using Equation 3 below.

$$Dout=K'\times(k01\times P0+k02\times P1+k03\times P2+k04\times B0+k05\times B1+k06\times B2)/(k11\times P0+k12\times P1+k13\times P2+k14\times B0+k15\times B1+k16\times B2)$$      Equation 3

K' denotes a constant derived from $c\times Tp/2$ where c denotes light speed (299,792,458 m/s) and Tp denotes the duration of pulsed irradiation light from light emitter 4.

When Equation 1 is substituted into Equation 3, the following expression can be obtained.

$$Dout=K'\times(P1+P2-2P0)-(B1+B2-2B0)/((P0+P1+P2)-(B0+B1+B2))$$

In this expression, distance signal Dout indicates the distance to a subject in case 1.

When Equation 2 is substituted into Equation 3, the following expression can be obtained.

$$Dout=K'\times2\times(P2-B2)/((P1+P2)-(B1+B2))$$

In this expression, distance signal Dout indicates the distance to a subject in case 2.

Distance calculator 202 thus calculates distance signal Dout indicating the distance to a subject.

Distance variation calculator 203 calculates distance variation signal DV indicating the standard deviation of the distance indicated by distance signal Dout. Hereinafter, the calculation of distance variation signal DV performed by distance variation calculator 203 will be described.

When the pixel signal coefficient values are determined by coefficient determiner 201, distance variation calculator 203 calculates, for each pixel unit 100, intermediate signal S1 (the numerator component of Dout) and received-light amount signal IRR (the denominator component of Dout), using Equations 4 and 5. Received-light amount signal IRR is a signal indicating an amount of received light, of light received by photoelectric converter 101, which includes only a reflected light component and does not include a background light component.

$$S1=k01\times P0+k02\times P1+k03\times P2+k04\times B0+k05\times B1+k06\times B2$$      Equation 4

$$IRR=k11 \times P0+k12 \times P1+k13 \times P2+k14 \times B0+k15 \times B1+ \\ k16 \times B2 \qquad \text{Equation 5}$$

In order to calculate an amount of variation regarding distance signal Dout, an error transmission formula which is expressed by Equation 6 can be used.

$$Z=f(x1,x2,x3,x4, \ldots ,xn)$$

[Math. 1]

$$\sigma_z^2 = \left(\frac{\partial Z}{\partial x_1} \cdot \sigma_{x1}\right)^2 + \left(\frac{\partial Z}{\partial x_2} \cdot \sigma_{x2}\right)^2 + \\ \left(\frac{\partial Z}{\partial x_3} \cdot \sigma_{x3}\right)^2 + \left(\frac{\partial Z}{\partial x_4} \cdot \sigma_{x4}\right)^2 + \ldots + \left(\frac{\partial Z}{\partial x_n} \cdot \sigma_{xn}\right)^2 \qquad \text{Equation 6}$$

Pixel signal P0 is expressed by Equation 7 below if e(P0) denotes a signal charge and Kh denotes a transform coefficient used to convert the signal charge into a pixel signal.

$$P0=Kh \times e(P0) \qquad \text{Equation 7}$$

Equation 8 holds true if σ(P0) denotes the standard deviation of shot noise that causes variation in pixel signals P0, and Equation 8 can be transformed into Equation 9.

[Math. 2]

$$\sigma(P0)=Kh \times \sqrt{e(P0)} \qquad \text{Equation 8}$$

[Math. 3]

$$\sigma(P0)^2=Kh^2 \times e(P0)=Kh \times P0 \qquad \text{Equation 9}$$

The same applies to other pixel signals P1, P2, B0, B1, and B2.

Distance variation calculator 203 calculates, as a standard deviation, variation regarding the distance indicated by distance signal Dout calculated using Equation 3. In other words, distance variation calculator 203 calculates, for each pixel unit 100 and using Equation 10 below, distance variation signal DV indicating the standard deviation of the distance indicated by distance signal Dout, based on Equation 6 which is an error transmission formula, and Equations 4, 5, and 9.

[Math. 4]

$$DV = \frac{K' \times \sqrt{Kh}}{IRR^2} \times \sqrt{\begin{array}{l}(k01 \times IRR - k11 \times S1)^2 \times P0 + \\ (k02 \times IRR - k12 \times S1)^2 \times P1 + \\ (k03 \times IRR - k13 \times S1)^2 \times P2 + \\ (k04 \times IRR - k14 \times S1)^2 \times B0 + \\ (k05 \times IRR - k15 \times S1)^2 \times B1 + \\ (k06 \times IRR - k16 \times S1)^2 \times B2\end{array}} \qquad \text{Equation 10}$$

Distance variation signal DV is calculated using Equation 10 with consideration given to pixel signal B0, pixel signal B1, and pixel signal B2 which correspond to a background light component. The transmission state of noise is thus appropriately reflected in either of case 1 where a subject is located relatively close to imaging apparatus 1 and case 2 where a subject is located relatively away from imaging apparatus 1. It is therefore possible to determine, using distance variation signal DV, the reliability of the distance indicated by distance signal Dout.

According to imaging apparatus 1, it is thus possible to determine the reliability of the distance indicated by distance signal Dout which is distance information to be calculated.

Embodiment 2

Hereinafter, an imaging apparatus according to Embodiment 2 will be described.

Figure 8:
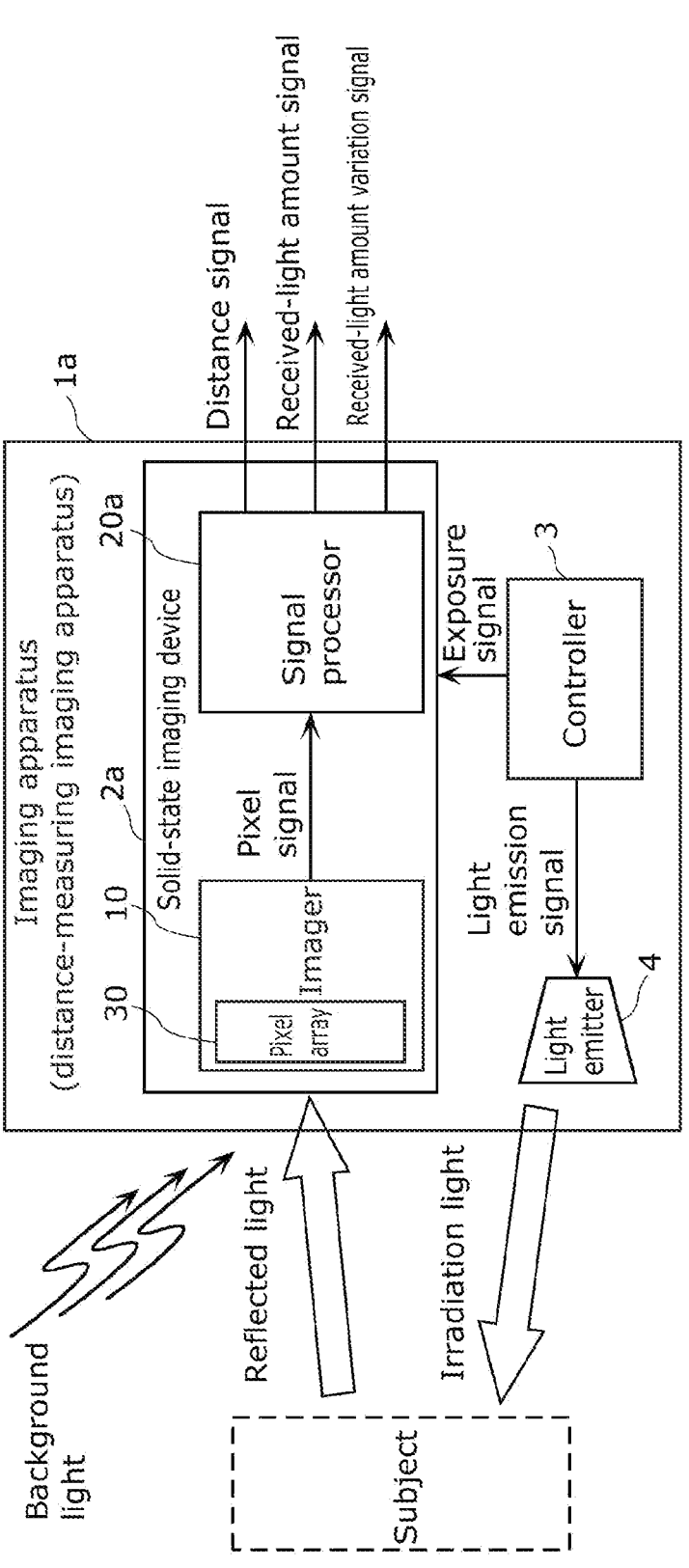
FIG. 8 is a block diagram illustrating an example of a configuration of an imaging apparatus according to Embodiment 2.

FIG. 8 is a block diagram illustrating an example of a configuration of imaging apparatus 1a according to Embodiment 2.

As illustrated in FIG. 8, imaging apparatus 1a includes signal processor 20a instead of signal processor 20, which is a change from imaging apparatus 1 according to Embodiment 1. Due to this change, imaging apparatus 1a includes solid-state imaging device 2a instead of solid-state imaging device 2, which is also a change from imaging apparatus 1 according to Embodiment 1.

Signal processor 20 according to Embodiment 1 is configured to calculate distance signal Dout and distance variation signal DV. In contrast, signal processor 20a is configured to calculate distance signal Dout, received-light amount signal IRR, and a received-light amount variation signal indicating an amount of variation regarding the amount of received light indicated by received-light amount signal IRR.

Figure 9:
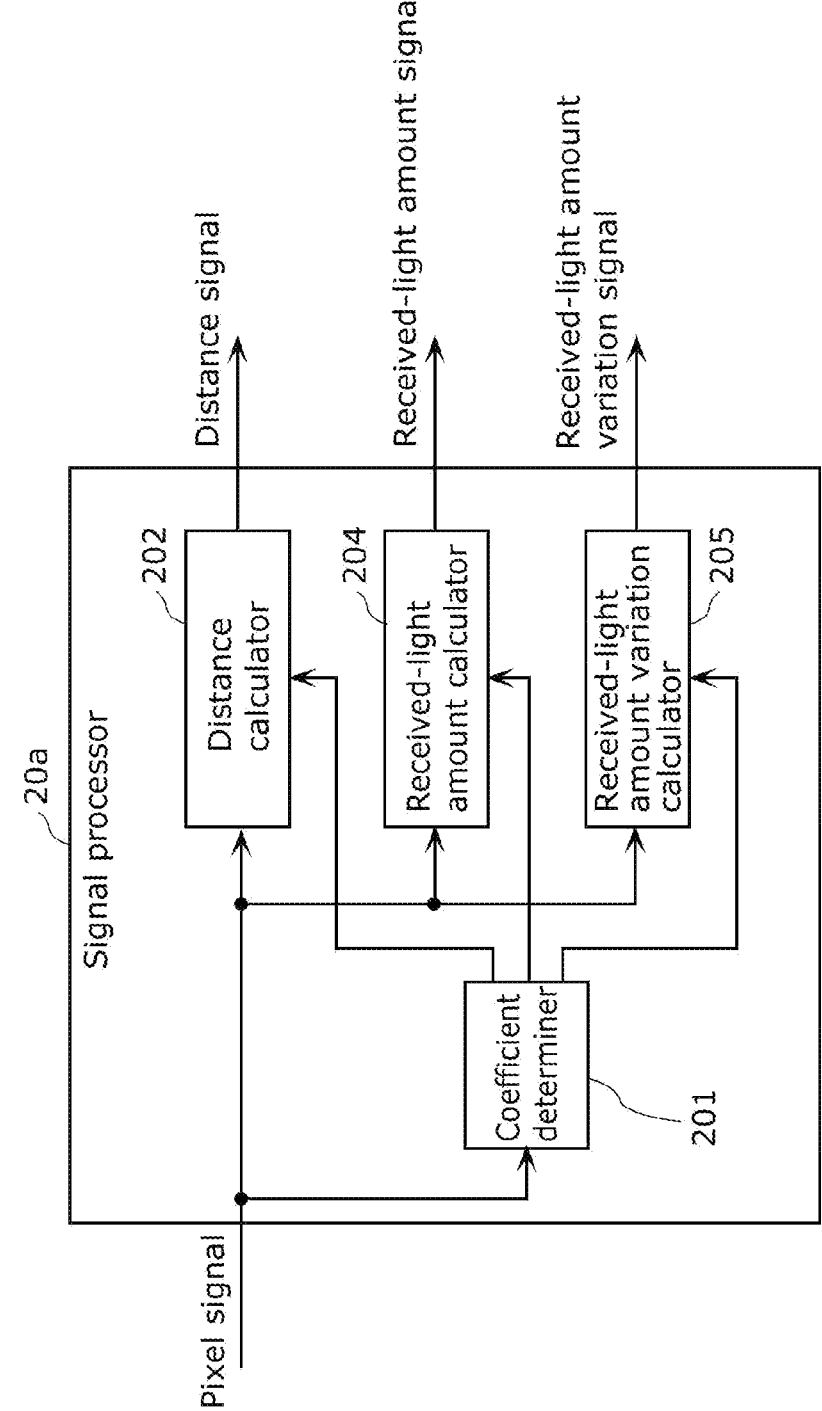
FIG. 9 is a block diagram illustrating an example of a configuration of a signal processor according to Embodiment 2.

FIG. 9 is a block diagram illustrating an example of a configuration of signal processor 20a.

As illustrated in FIG. 9, signal processor 20a includes coefficient determiner 201, distance calculator 202, received-light amount calculator 204, and received-light amount variation calculator 205. Signal processor 20a is implemented by, for example, a logic circuit. Alternatively, signal processor 20a is implemented by using, for example, a memory and a processor that executes a program stored in the memory.

Received-light amount calculator 204 calculates received-light amount signal IRR based on pixel signals that are output from imager 10 and coefficients determined by coefficient determiner 201. More specifically, received-light amount calculator 204 calculates received-light amount signal IRR using Equation 5.

Received-light amount variation calculator 205 calculates a received-light amount variation signal indicating an amount of variation regarding the amount of received light indicated by received-light amount signal IRR, based on pixel signals that are output from imager 10 and coefficients determined by coefficient determiner 201.

Hereinafter, the calculation of the received-light amount variation signal performed by received-light amount variation calculator 205 will be described.

Received-light amount variation calculator 205 calculates received-light amount variation signal IRV indicating the standard deviation of the amount of received light indicated by received-light amount signal IRR.

Received-light amount variation signal IRV is calculated using Equation 11 below based on Equation 5 and Equation 6 which is an error transmission formula.

[Math. 5]

$$IRV = \sqrt{\begin{array}{l}(k11 \times \sigma(P0))^2 + (k12 \times \sigma(P1))^2 + \\ (k13 \times \sigma(P2))^2 + (k14 \times \sigma(B0))^2 + \\ (k15 \times \sigma(B1))^2 + (k16 \times \sigma(B2))^2\end{array}} \qquad \text{Equation 11}$$

Accordingly, when pixel signal coefficient values are determined by coefficient determiner 201 for each of pixel units 100, received-light amount variation calculator 205 calculates, for the corresponding pixel unit 100, received-light amount variation signal IRV using Equation 12 below obtained by transforming Equation 11 with the use of Equation 9.

[Math. 6]

$$IRV = \sqrt{Kh} \times \sqrt{\frac{k11^2 \times P0 + k12^2 \times P1 + k13^2 \times P2 +}{k14^2 \times B0 + k15^2 \times B1 + k16^2 \times B2}}$$

Equation 12

Received-light amount variation signal IRV is calculated using Equation 12 with consideration given to pixel signal B0, pixel signal B1, and pixel signal B2 which correspond to a background light component. The transmission state of noise is thus appropriately reflected regarding each pixel unit 100 in either of case 1 where a subject is located relatively close to imaging apparatus 1 and case 2 where a subject is located relatively away from imaging apparatus 1.

A ratio between received-light amount signal IRR indicating an amount of received light of a reflected light component alone and received-light amount variation signal IRV with consideration given to a background light component is equivalent to the signal-to-noise ratio (SNR) of a distance indicated by distance signal Dout. It is therefore possible to determine the reliability of the distance indicated by distance signal Dout, using received-light amount variation signal IRV.

According to imaging apparatus 1a, it is thus possible to determine the reliability of the distance indicated by distance signal Dout which is distance information to be calculated.

A computational amount required for Equation 12 is less than that required for Equation 10. Signal processor 20a therefore has an advantage that the processing load of the logic circuit or processor becomes lighter compared to that of the logic circuit or processor in signal processor 20 according to Embodiment 1.

Supplementary Notes

Although the imaging apparatus according to an aspect of the present disclosure has been described based on Embodiments 1 and 2, the present disclosure is not limited to these embodiments. One or more of the aspects according to the present disclosure may also encompass various modifications that may be conceived by those skilled in the art to the embodiments, and embodiments achieved by combining elements in different embodiments, without departing from the scope of the present disclosure.

Embodiment 1 has illustrated that imaging apparatus 1 calculates distance variation signal DV for each pixel unit 100. The configuration of imaging apparatus 1, however, does not necessarily need to be limited to such a configuration as long as imaging apparatus 1 is capable of calculating distance variation signal DV for one or more pixel units 100 among pixel units 100. For example, imaging apparatus 1 may be configured to leave one or more pixel units 100 to thin out other pixel units 100 among all of pixel units 100, and calculate distance variation signal DV for each of pixel units 100 that have not been thinned out.

Embodiment 2 has illustrated that imaging apparatus 1a calculates received-light amount variation signal IRV for each pixel unit 100. The configuration of imaging apparatus 1a, however, does not necessarily need to be limited to such a configuration as long as imaging apparatus 1a is capable of calculating received-light amount variation signal IRV for one or more pixel units 100 among pixel units 100. For example, imaging apparatus 1a may be configured to leave one or more pixel units 100 to thin out other pixel units 100 among all of pixel units 100, and calculate received-light amount variation signal IRV for each of pixel units 100 that have not been thinned out.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be widely utilized for imaging apparatuses that obtain distance information of a subject.

The invention claimed is:

1. A variation information calculation method used by an imaging apparatus including a light emitter that irradiates a subject with pulsed light, and a solid-state imaging device that includes: pixel units each of which converts received light into a signal charge;

an exposure controller that controls accumulation of the signal charge performed by each of the pixel units; and a signal processor that calculates distance information indicating a distance to the subject, the variation information calculation method comprising:

causing, by the exposure controller, each of the pixel units to accumulate, within one frame, the signal charge at different time phases with respect to a period during which the pulsed light is emitted to generate signals each related to the signal charge which is accumulated at each of the different time phases by each of the pixel units;

multiplying, by the signal processor, each of the signals with coefficients, respectively to calculate, by a time-of-flight (TOF) method, the distance information of the subject projected by each of the pixel units, the signals comprising a signal component and a background component, the coefficients varying depending on the distance to the subject and being determined for the signal component and the background component, respectively;

calculating, by the signal processor, variation information using each of the signals and the coefficients applied to the signals in the calculation of the distance information, the variation information indicating an amount of variation regarding the distance indicated by the distance information of each of the pixel units; and outputting, by the solid-state imaging device, the distance information and the variation information indicating the amount of variation regarding the distance.

2. A variation information calculation method used by an imaging apparatus including a light emitter that irradiates a subject with pulsed light, and a solid-state imaging device that includes: pixel units each of which converts received light into a signal charge; an exposure controller that controls accumulation of the signal charge performed by each of the pixel units; and a signal processor that calculates distance information indicating a distance to the subject, the variation information calculation method comprising:

causing, by the exposure controller, each of the pixel units to accumulate, within one frame, the signal charge at different time phases with respect to a period during which the pulsed light is emitted to generate signals each related to the signal charge which is accumulated at each of the different time phases by each of the pixel units;

calculating, by the signal processor, using each of the signals and by a time-of-flight (TOF) method, the distance information of the subject projected by each of the pixel units, the signals comprising a signal component and a background component;

multiplying, by the signal processor, each of the signals with coefficients, respectively a to calculate light emission component received-light amount information indicating an amount of received light attributed to the pulsed light with which the subject is irradiated by the light emitter, the coefficients varying depending on the distance to the subject and being determined for the signal component and the background component, respectively;

calculating, by the signal processor, variation information using each of the signals and the coefficients applied to the signals in the calculation of the light emission component received-light amount information, the variation information indicating an amount of variation regarding the amount of received light indicated by the light emission component received-light amount information of each of the pixel units; and outputting, by the solid-state imaging device, the light emission component received-light amount information and the variation information indicating the amount of variation regarding the amount of received light.

3. An imaging apparatus, comprising:

a light emitter that irradiates a subject with pulsed light; and a solid-state imaging device that includes:

pixel units each of which converts received light into a signal charge;

an exposure controller that controls accumulation of the signal charge performed by each of the pixel units; and a signal processor that calculates distance information indicating a distance to the subject, wherein the exposure controller causes each of the pixel units to accumulate, within one frame, the signal charge at different time phases with respect to a period during which the pulsed light is emitted, to generate signals each related to the signal charge which is accumulated at each of the different time phases by each of the pixel units, the signal processor:

multiplies the signals with coefficients, respectively, to calculate, by a time-of-flight (TOF) method, the distance information of the subject projected by each of the pixel units, the signals comprising a signal component and a background component, the coefficients varying depending on the distance to the subject and being determined for the signal component and the background component, respectively; and calculates variation information using each of the signals and the coefficients applied to the signals in the calculation of the distance information, the variation information indicating an amount of variation regarding the distance indicated by the distance information of each of the pixel units, and the solid-state imaging device outputs the distance information and the variation information indicating the amount of variation regarding the distance.

4. The imaging apparatus according to claim 3, wherein the signal processor includes a mechanism for switching a set of coefficients in accordance with a magnitude relationship of signal charges, the set of coefficients being used for the calculation of the distance information, at least one of the coefficients being applied to a different one of the signals related to the signal charge, the signal charges being the signal charge accumulated at the different time phases.

5. The imaging apparatus according to claim 3, wherein the one frame includes a first exposure period, a second exposure period, and a third exposure period, the first exposure period synchronizes with time Tp which is a period from a start until an end of irradiation of the pulsed light, the second exposure period is a period from when the irradiation of the pulsed light ends until when time Tp elapses, the third exposure period is a period from when the second exposure period ends until when time Tp elapses, the signal component and the background component are obtained for each of the first, second and third exposure period, and six coefficients are determined for the signal component and the background component for each of the first, second and third exposure period.

6. An imaging apparatus, comprising:

a light emitter that irradiates a subject with pulsed light; and a solid-state imaging device that includes:

pixel units each of which converts received light into a signal charge;

an exposure controller that controls accumulation of the signal charge performed by each of the pixel units; and a signal processor that calculates distance information indicating a distance to the subject, wherein:

the exposure controller causes each of the pixel units to accumulate, within one frame, the signal charge at different time phases with respect to a period during which the pulsed light is emitted, to generate signals each related to the signal charge which is accumulated at each of the different time phases by each of the pixel units, the signal processor:

calculates, using each of the signals and by a time-of-flight (TOF) method, the distance information of the subject projected by each of the pixel units, the signals comprising a signal component and a background component;

multiplies the signals with coefficients, respectively, to calculate light emission component received-light amount information indicating an amount of received light attributed to the pulsed light with which the subject is irradiated by the light emitter, the coefficients varying depending on the distance to the subject and being determined for the signal component and the background component, respectively; and calculates variation information using each of the signals and the coefficients applied to the signals in the calculation of the light emission component received-light amount information, the variation information indicating an amount of variation regarding the amount of received light indicated by the light emission component received-light amount
information of each of the pixel units, and the solid-state imaging device outputs the light emission
component received-light amount information and the
variation information indicating the amount of varia-
tion regarding the amount of received light.

7. The imaging apparatus according to claim 6, wherein the signal processor includes a mechanism for switching
a set of coefficients in accordance with a magnitude
relationship of signal charges, the set of coefficients
being used for the calculation of the light emission
component received-light amount information, at least
one of the coefficients being applied to a different one
of the signals related to the signal charge, the signal
charges being the signal charge accumulated in the
different time phases.

\* \* \* \* \*